Aug. 14, 1934.  W. A. DUNAGIN  1,969,969
DEPTH MEASURING DEVICE
Filed Jan. 5, 1934  2 Sheets-Sheet 2
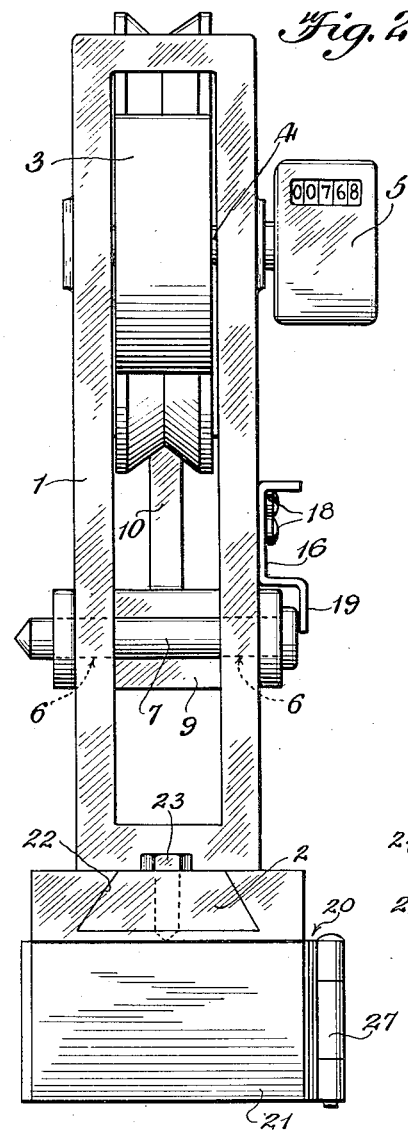
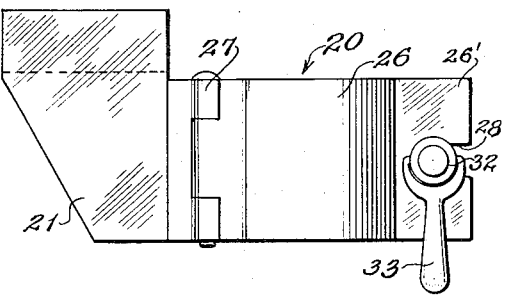
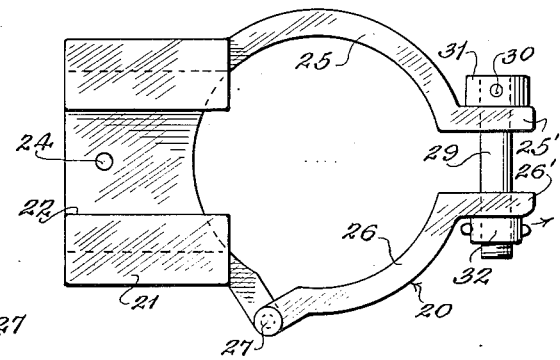
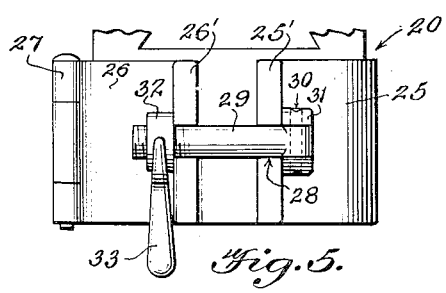
Inventor
W. A. Dunagin.
By William C. Linton.
Attorney Patented Aug. 14, 1934

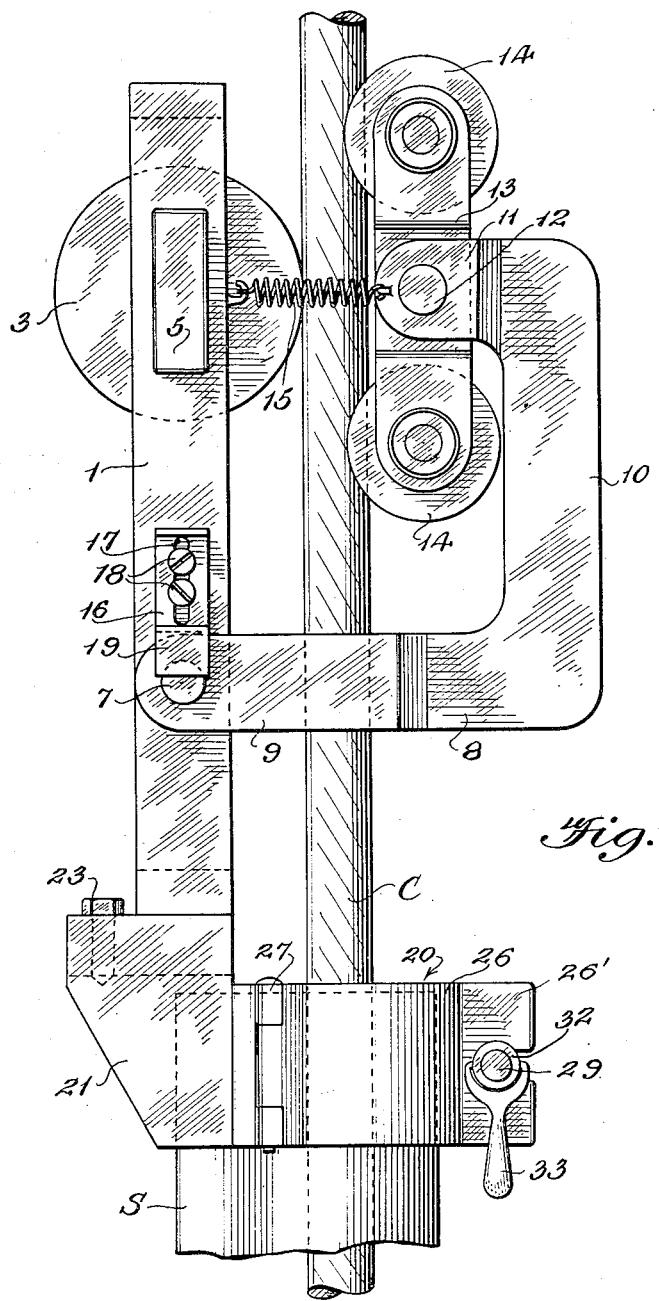

1,969,969

UNITED STATES PATENT OFFICE

1,969,969

DEPTH MEASURING DEVICE

William A. Dunagin, Laurel, Miss., assignor of one-eighth to Urban B. Hughes, one-eighth to Joe Modisett, and one-eighth to Ferdinand W. Sullivan, all of Laurel, Miss.

Application January 5, 1934, Serial No. 705,421

5 Claims. (Cl. 33—134)

The present invention relates to depth measuring devices and has for one of its main objects to provide a device particularly adapted for use on standard rotary drilling and coring equipment, and capable of being readily attached thereto for accurately measuring and determining the depth at which the well is being drilled.

Another important object of the invention resides in the provision of a device of the character mentioned which requires no extra supports or hangers to hold and maintain the same in position, but is attachable directly to the drill casing or hollow drill stem whereby the rotary table and drill stem may be freely turned to prevent sticking of the stem without interfering with the operation of the measuring device or affecting the accuracy of the measured depth.

The invention also aims to provide a well depth measuring device of relatively few parts all of which are connected together thereby rendering the device self-contained so that when not in use the same may be bodily removed and stored away or, when necessary, carried from one well to another and instantly attached for operation without requiring skilled adjustment.

It is also among the desired features of the invention to provide a measuring device of the type referred to having a rugged construction eliminating slack or back lash whereby to impart to the device an assured and positiveness in operation and thus obviate the possibilities of inaccuracy in its measuring function.

Other important objects and advantages of the invention will be in part obvious and in part pointed out hereinafter.

In order that the invention and its mode of operation may be readily understood by those persons skilled in the art, I have in the accompanying drawings and in the detailed description based thereupon, set out a possible embodiment of the same.

In these drawings:

Figure 1 is a side elevation of the device illustrating the same in operative position;

Figure 2 is a face elevation thereof;

Figure 3 is a side elevation of the supporting clamp member;

Figure 4 is a plan of the same; and

Figure 5 is an end view of said clamp member.

Having more particular reference to the drawings wherein like characters of reference will designate corresponding parts throughout, my improved device may be stated to comprise a rigid frame 1 made of suitable metal and having at one end thereof a dove-tailed projection 2 extending laterally from one face of said frame for the purpose to be later specified.

Received within the opposed end portion of the frame 1 is a wheel 3 provided with an integral supporting shaft 4 having bearing in said frame, which for this purpose, is preferably supplied with anti-frictional bearings of any suitable known type; said wheel being adapted to contact with and frictionally engage a cable C traveling within the casing or hollow stem S of a rotary drill. One extremity of the wheel shaft 4 is made to project for a short distance out of the side of the frame 1 for operative connection with a mechanical counter or register 5. The wheel 3 has an accurately determined circumference, preferably measuring exactly twelve inches (12″), whereby upon each revolution of the wheel caused by the traveling cable C in contact therewith, the counter 1 will register one foot (1′).

Formed in the sides of the frame 1 and positioned at the intermediate portion thereof, is a pair of diametrically opposed openings 6 designed to freely receive the transverse pin 7 adapted to pivotally connect to that portion of the frame, a metallic yoke 8 formed with a fork section 9 straddling the cable C and adapted to snugly embrace the sides of the frame 1, and with an arm section 10 rigid with said fork section, disposed to extend approximately at right angles thereto and arranged to lie in parallel relation to the side of the cable C opposite that in contact with measuring wheel 3. The free end 11 of the yoke arm 10 is bent upon itself in a direction substantially paralleling the fork section of the latter and in substantial alinement with the axis of the measuring wheel 3.

Pivoted at its medial portion to said end 11 of the yoke arm 10 by means of a riveted bolt 12 or the like, is a bar 13 carrying at each extremity a pulley 14 preferably mounted in anti-frictional bearings and having a groove cut into its peripheral surface to accommodate the cable C. In this manner, the yoke 8 supports the peripherally grooved pulleys 14 in the same plane with the measuring wheel 3, whereby to guide the cable C and maintain the same over the measuring wheel.

Coil springs 15 detachably connected to hooks fixed to the end 11 of the yoke 8 supporting the pulley carrying bar 13, and to the frame 1 adjacent its bearings for the wheel 3, constantly urge said pulleys towards the measuring wheel, thus forcing the cable C in positive frictional engagement with said wheel.

That the pin 7 pivotally connecting the yoke 8 to the frame 1, may be protected against accidental displacement which would obviously incur possibilities of improper and inaccurate working of the device, a sliding latch 16 is provided upon the frame 1. This latch is formed with a longitudinal slit 17 receiving one or more screws 18, and is provided with a tongue 19 capable when in operative position, to extend over the head of the pin 7 and thus lock the same in the manner clearly represented in the drawings. It will, of course, be understood that upon retracting the latch 16, the pin 7 may be freely handled either to connect or disconnect the yoke 8 to or from the frame 1.

The frame 1 together with the parts and elements associated therewith as hereinbefore described, is supported in operative position by means of a clamp 20 adapted to rigidly grip the casing or hollow stem S of the rotary drill, and having a block 21 preferably made integral therewith. A dove-tailed slot 22 is cut into the normal upper portion of said block 21 to receive therein the dove-tailed projection 2 of the frame 1. A bolt or set screw 23 traversing said projection and extending into a recess 24 is provided for this purpose in the block 21, and may be used to fixedly couple the latter with the frame.

The clamp 20 is, of preference, constituted of two sections, one section 25 being relatively stationary whereas the other section 26 is hingedly connected thereto as indicated at 27 in the drawings. The opposed extremities of the clamp sections are turned outwardly in the shape of ears 25' and 26' respectively, and are slotted, as more clearly shown at 28 in Figures 3 and 5, to allow the swinging of a tightening bolt 29 pivoted at one end by means of a pin 30 to a retaining nut 31 fixed to the ear 25' of the stationary clamp section 25. The remaining end of the swinging bolt 29 has screw threaded engagement with a tightening nut 32 supplied with a handle 33 to facilitate its actuation.

In using my improved measuring device, the clamp 20 is rigidly engaged about the casing or hollow stem of an ordinary rotary drill, so that the measuring device engages in turn the cable C traveling within said casing or hollow stem in the manner illustrated in Figure 1 of the drawings. The cable C being held in constant positive frictional contact with the measuring wheel 1 by action of the spring actuated yoke 8 carrying the pulleys 14 against said cable, will cause said wheel to revolve, each revolution being recorded by the mechanical counter 5 directly connected to the wheel shaft 4 so that the length of the cable paid out may always be ascertained, and since the cable follows the drilling point, the depth at which the drilling takes place may be known at all times by referring to the counter.

It will be appreciated that, because the device is supported directly by the drill casing or hollow stem S, the device will not interfere with the working of the rotary table and drill stem, nor will the turning of the rotary table and drill stem affect the accurate operation of the device.

It will be understood that when it is desired to remove the device, this may be done easily and quickly by merely disconnecting the yoke 8 from the frame 1 and unhooking the spring 15 whereupon the frame 1 may be removed from the supporting clamp which remains fixed to the drill casing or hollow stem S for subsequent attachment of the measuring device. Obviously, if preferred, the frame 1 may remain connected to the supporting clamp 20 and the same loosened and taken away bodily with the frame from the drill casing or hollow stem S. This latter procedure may be more convenient, should it become desirable to utilize the device in conjunction with another drilling equipment.

Due to the unitary structure of the device, it may be easily handled and transported from one well to another or conveniently stored away when not in use. Also, because of the simplified structure of the device, the same is given a rugged construction and consequently assured of an increased positiveness in operation and against premature wear and tear.

Manifestly, the construction shown and described is capable of considerable modification and such modifications as come within the scope of my claims, I consider within the spirit of my invention.

I claim:—

1. A device of the character described comprising a frame, measuring means carried by said frame and contacting with a cable, a yoke having means engageable with the cable for maintaining the same in contact with said measuring device, said yoke provided with a fork end straddling the cable and fitted to the frame, a pin removably pivoting said yoke to the frame, and latch means carried by the frame and movable thereon to lock the pin in position.

2. A device of the character described comprising a frame having a dove-tailed projection at one end portion thereof, measuring means carried by the other end portion of the frame and contacting with a cable, a yoke pivoted to the intermediate portion of said frame and having means engageable with the cable for maintaining the same in contact with said measuring means, and a support for said frame having a dove-tailed slot for engaging the dove-tailed projection on the frame.

3. A device of the character described comprising a frame having a dove-tailed projection at one end portion thereof, measuring means carried by the other end portion of the frame and contacting with a cable, a yoke pivoted to the intermediate portion of said frame and having means engageable with the cable for maintaining the same in contact with said measuring means, a support for said frame having a dove-tailed slot for removably engaging the dove-tailed portion on the frame, and securing means traversing the dove-tailed projection on the frame and extending in said support for detachably affixing said projection within the dove-tailed slot of the support of said frame.

4. A device for measuring the depth at which a well is being drilled, comprising in combination with the drill tubular body and cable traveling therein, a frame having a dove-tailed projection at one end portion thereof, means carried by the other end portion of the frame in engagement with the cable for measuring the length thereof passing into said body, a clamp connected to the drill tubular body, a block rigid with said clamp and having a dove-tailed slot formed therein for engagement with the dove-tailed projection of the frame to support the same in position.

5. A device for measuring the depth at which a well is being drilled, comprising in combination with the drill tubular body and cable traveling therein, a frame having a dove-tailed projection at one end portion thereof, means carried by the other end portion of the frame in engagement with the cable for measuring the length thereof passing into said body, a clamp connected to the drill tubular body, a block rigid with said clamp and having a dove-tailed slot formed therein for removable engagement with the dove-tailed projection of the frame to support the same in position, and securing means traversing the dove-tailed projection on the frame and extending in said block for detachably affixing said projection within the dove-tailed slot in the block.

WILLIAM A. DUNAGIN.